US012772975B2

(12) United States Patent

Lundin et al.

(10) Patent No.: US 12,772,975 B2

(45) Date of Patent: Oct. 27, 2026

(54) INSECT REPELLENT-POLYMER GELS

(71) Applicant: The Government of the United States of America, as represented by the Secretary of the Navy, Arlington, VA (US)

(72) Inventors: Jeffrey G. Lundin, Burke, VA (US); Javier Jimenez, Washington, DC (US); Matthew D. Thum, Annapolis, MD (US); James E. Cilek, Jacksonville, FL (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 216 days.

(21) Appl. No.: 18/778,667

(22) Filed: Jul. 19, 2024

(65) Prior Publication Data

US 2025/0024835 A1 Jan. 23, 2025

Related U.S. Application Data

(60) Provisional application No. 63/514,379, filed on Jul. 19, 2023.

(51) Int. Cl.

*A01N 25/10* (2006.01)
*A01N 25/34* (2006.01)
*A01N 37/26* (2006.01)
*A01P 17/00* (2006.01)

(52) U.S. Cl.

CPC ............ *A01N 25/10* (2013.01); *A01N 25/34* (2013.01); *A01N 37/26* (2013.01); *A01P 17/00* (2021.08)

(58) Field of Classification Search

CPC ........ A01N 25/10; A01N 25/34; A01N 37/26; A01P 17/00

See application file for complete search history.

(56) References Cited

U.S. PATENT DOCUMENTS

2022/0018045 A1 1/2022 Lundin et al.

FOREIGN PATENT DOCUMENTS

JP 3171251 U * 10/2011 ............ A41D 13/00

OTHER PUBLICATIONS

Ryan et al., Polym Advan Technol 2020, 31 (12), 3039-3047.
Jin et al., ACS Omega 2022, 7 (10), 8493-8497.
Mullarney et al., Polymer 2006, 47 (11), 3845-3855.
Tong et al., Macromol Biosci 2015, 15 (12), 1679-1686.
Lin et al., Macromolecules 2002, 35 (17), 6697-6706.
Jimenez et al., Polymer 2021, 124079.

* cited by examiner

*Primary Examiner* — Trevor Love

(74) *Attorney, Agent, or Firm* — US Naval Research Laboratory; Joseph T. Grunkemeyer

(57) ABSTRACT

Disclosed herein is a composition having an insect repellent compound and a polymer that is miscible in the insect repellent compound at 23° C. Also disclosed herein is a method of: providing an insect repellent compound, providing a polymer that is miscible in the insect repellent compound at 23° C., and dissolving the polymer in the insect repellent compound to form a composition.

11 Claims, 13 Drawing Sheets

| | |
|---|---|
| Equation | y = a + b*x |
| Plot | Gel Temperature |
| Weight | No Weighting |
| Intercept | -54.36403 ± 2.9978 |
| Slope | 2.13284 ± 0.08339 |
| Residual Sum of Squares | 20.95792 |
| Pearson's r | 0.99469 |
| R-Square (COD) | 0.98941 |
| Adj. R-Square | 0.9879 |

| | |
|---|---|
| Model | Exp2PMod1 |
| Equation | y = a*exp(b*x) |
| Plot | [η]* |
| a | 4.1927E-9 ± 3.8958 |
| b | 10.31688 ± 0.3020 |
| Reduced Chi- | 2.2134 8E7 |
| R-Square (C | 0.99847 |
| Adj. R-Square | 0.99816 |

Temperature (°C)

$$W(t) = W_0 + \sum_{i=1}^{3} W_i e^{-\lambda_i t}$$

P(AN-VC)/DEET Gel $W_0 = 39.0$ $W_1 = 0.156;\ \lambda_1 = 2.57\text{x}10^{-2}$ $W_2 = 0.156;\ \lambda_2 = 3.19\text{x}10^{-3}$ $W_3 = 60.6;\ \lambda_3 = 4.66\text{x}10^{-6}$ $R^2 = 0.99994$

INSECT REPELLENT-POLYMER GELS

REFERENCE TO RELATED APPLICATIONS

This application claims the benefit of U.S. Provisional Application No. 63/514,379, filed on Jul. 19, 2023. The provisional application and all other publications and patent documents referred to throughout this nonprovisional application are incorporated herein by reference.

TECHNICAL FIELD

The present disclosure is generally related to insect repellent materials.

DESCRIPTION OF THE RELATED ART

The World Health Organization estimates vector-borne diseases to kill 700,000 people annually, with mosquito-transmitted malaria being responsible for over 70% of those lives lost.[1] Preventative strategies for indoor protection such as long-lasting insecticidal bednets and indoor residual spraying have been effective in reducing *Plasmodium falciparum* infection in endemic Africa by half and the incident of clinical disease by 40% between 2000 and 2015.2 However, outdoor protection is still dominated by aerosol-type sprays or topical lotions which are limited by their short efficacy time due to evaporation.[3] As a result, efforts to increase insect repellent/insecticide efficacy times have included physically entrapping the substrate into a polymeric material for outdoor protection.[4]

Passively-controlled substrate release has most commonly been investigated for in vivo drug delivery systems through gelled polymer morphologies.[5,6] The high degree of free space in gelled microstructures compared to paracrystalline materials allows for efficient substrate loading, thus making gels the preferred loading vessel for in vivo drug delivery systems.[7] Physical gels give the added benefit of thermos-reversal properties through the formation and deformation of microcrystals at polymer chain entanglement junctions. At temperatures above this gel point, processes such as injection molding or fiber spinning can form consumer products such as bracelets or textiles without requiring a crosslinking/curing stage. Moreover, once depleted of their substrate the residual polymer can then be recycled due to maintaining a linear structure thus forming a circular economy.

Physical gels are a miscible polymer and solvent system that exhibit a storage modulus greater than its loss modulus ($G''/G'=\tan(\delta)\leq 1$) at a frequency of 1 Hz.[8] The gel point where $\tan(\delta)=1$ is dependent on variables such as polymer concentration, polymer molecular weight, polymer/solvent types, and temperature. The insect repellent loading in a physical gel is maximized if the repellent acts as the gelling solvent. Therefore, the polymer and insect repellent must be miscible with one another. Hansen Solubility Parameters (HSPs) quantify chemical affinities through a tri-coordinate characterization that has been proven to determine polymer/solvent miscibility.[9]

Previous attempts towards insect repellent-infused polymeric materials have included melting or dissolution of polymer systems loaded with insect repellent and subsequent processing to form a finished product with insect repellent properties. These materials have reported adequate repellency in the order of weeks. However, much of these polymer/insect repellent systems are immiscible with one another. As a result, phase separation between the insect repellent and the polymer system may occur. This potential for phase separation limits the maximum insect repellent loading due to concerns with decreased mechanical properties, uneven distribution of insect repellent, and increased spinning breakages. Such concerns are also present in other polymer processing techniques such as injection molding. Moreover, techniques that require polymer melting demand high temperatures that result in vaporization and subsequent loss of insect repellent through processing. This vaporization results in lower insect repellent concentrations within the finished product and can also lead to safety concerns as polymer melt processing is typically performed above the flash point of various insect repellents (e.g., N,N-diethyl-meta-toluamide has a flash point of 155° C.).

SUMMARY OF THE INVENTION

Disclosed herein is a composition comprising an insect repellent compound and a polymer that is miscible in the insect repellent compound at 23° C.

Also disclosed herein is a method comprising: providing an insect repellent compound, providing a polymer that is miscible in the insect repellent compound at 23° C., and dissolving the polymer in the insect repellent compound to form a composition.

BRIEF DESCRIPTION OF DRAWINGS

A more complete appreciation will be readily obtained by reference to the following Description of the Example Embodiments and the accompanying drawings.

DETAILED DESCRIPTION

Figure 1A:
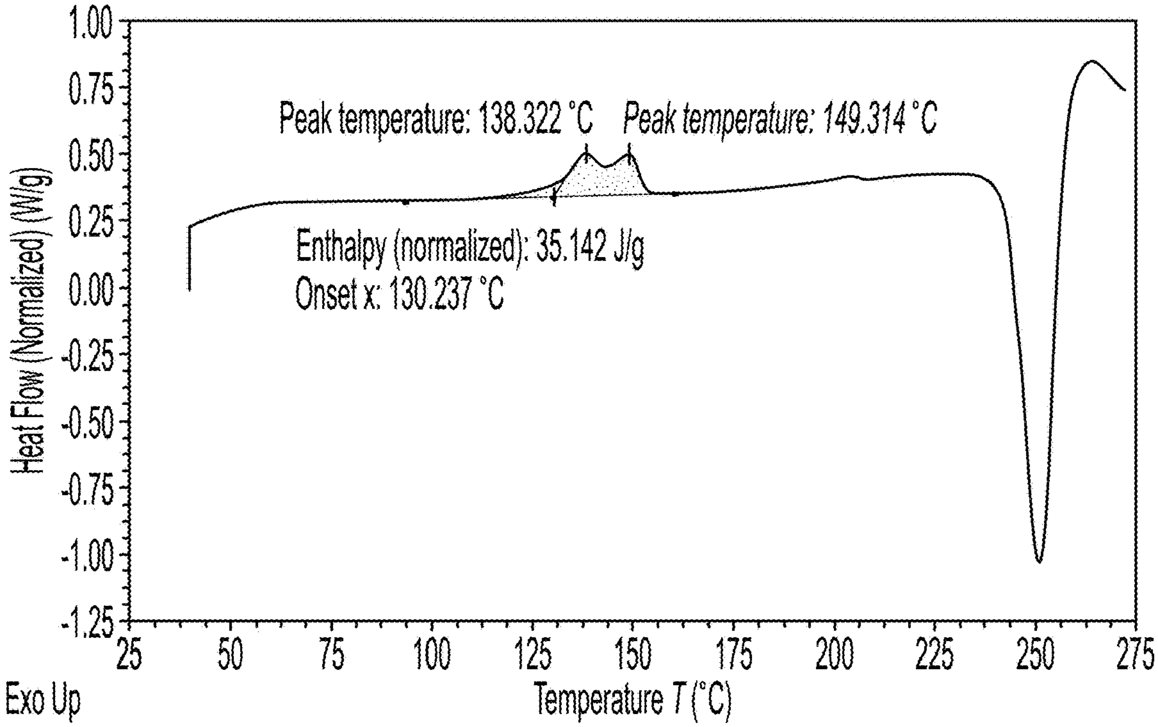
FIGS. 1A and 1B show DSC temperature sweeps of P(AN-VC) fibers without (FIG. 1A) and with (FIG. 1B) DEET.

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

Disclosed herein are physical gels highly loaded with insect repellents for long-term insect repellent applications. The purpose is to repel biting arthropods (insects, ticks, etc.) for multiple weeks. The gel can exist in various forms such as fibers, film, patches, etc. as appropriate for the desired application. The system is composed solely of linear polymer and insect repellent that leads to high loading of insect repellent. The physical gel is formed through simple dissolution methods, resulting in facile fabrication.

The present composition comprises an insect repellent compound and a polymer that is miscible in the insect repellent compound at 23° C. Miscibility may persist or diminish at elevated temperatures such as 130° C., but it may be desirable to maintain miscibility at any temperatures at which the composition is made or used. The polymer may be dissolved in the insect repellent compound, and the composition may contain at least 1, 25, or 50 wt % of the insect repellent compound. Many insect repellent compounds are known in the art, including N,N-diethyl-meta-toluamide (DEET).

Physical gels demand miscible polymer and solvent systems to allow for polymer coil expansion and high degrees of polymer chain entanglements, which can develop into microcrystalline physical crosslinks upon thermal quenching below the sol-gel transition temperature (also known as gel temperature). Determining whether a polymer is miscible in the insect repellent compound may be done by physically combining the two. Candidate polymers may be selected based on the polymer's relative energy difference (RED) with respect to the insect repellent compound. A RED value of less than or equal to 1 can indicate miscibility, while greater than 1 can indicate immiscibility. The RED value may be calculated according to methods described below. One polymer suitable for use with DEET is poly(acrylonitrile-co-vinyl chloride) (P(AN-VC)). Other suitable polymers may include, but are not limited to, polystyrene, polyvinyl chloride, polyvinyl dichloride, polymethyl methacrylate, polysulfone, polyvinyl pyrrolidone, or a copolymer thereof.

The composition may be spun into fibers or formed into films. Fibers may be incorporated into a garment or other fabrics.

The composition demonstrates utilizing the insect repellent as the dissolving solvent for a polymeric material to form a highly insect repellent loaded physical gel for long-term passively controlled release. DEET was used in this study, as it is the most commercially used insect repellent, but these methods can apply to any insect repellent. The gelling polymer was chosen based on its miscibility with DEET as calculated by Hansen Solubility Parameters (HSP) using HSPiP software. Each chemical is characterized by their own parameters that are derived from their dispersion forces ($\delta_D$), polar forces ($\delta_P$), and hydrogen bonding forces ($\delta_H$). These values may be calculated or found in *Hansen Solubility Parameters A User's Handbook, Second Edition* (CRC Press, 2007). This tri-coordinate parameter system can determine miscibility between a polymer and solvent system by calculating the distance between the select polymer and solvent system (Ra) through the following equation:

$$(Ra)^2 = 4(\delta_{D2} - \delta_{D1})^2 + (\delta_{P2} - \delta_{P1})^2 + (\delta_{H2} - \delta_{H1})^2$$

Miscibility between a solvent and polymer system is determined through the following equation:

$$RED = Ra/Ro$$

where Ro is the inherent interaction radius for a select polymer or copolymer. If Ra≤Ro (RED≤1), the solvent system will dissolve or swell the polymer. If Ra>Ro (RED>1), the solvent system will have no affinity to the polymer.

The HSPs and resulting RED values between DEET and various polymers is shown in Table 1. RED≤1 for an array of polymer underscoring its miscibility with DEET. Polyvinyl chloride is a thermoplastic polymer with a degradation temperature lower than its melting temperature, thus being an important polymer in fire retardant textiles. Specifically, modacrylic copolymers of acrylonitrile and vinyl chloride are commercially produced for various fire retardant applications such as children garments, upholstery, faux fur, and protective outerwear. Modacrylic filaments composed of 1:1 mol/mol acrylonitrile-co-vinyl chloride (P(AN-VC)) had an RED value of 0.90 to DEET, suggesting miscibility.

TABLE 1

HSPs of DEET and various polymers

| Material | δd | δp | δh | Ro | RED DEET |
|---|---|---|---|---|---|
| DEET | 18.1 | 7.1 | 3.6 | xxx | xxx |
| P(AN-VC) 1:1 mol/mol | 20.9 | 11.9 | 4.4 | 8 | 0.93 |
| Polyurethane (PU) | 18.1 | 9.3 | 4.5 | 8 | 0.30 |
| Polyethylmethacrylate (PEMA) | 17.6 | 9.7 | 4.0 | 8 | 0.35 |
| Polystyrene (PS) | 18.5 | 4.5 | 2.9 | 8 | 0.35 |
| PET | 18.2 | 6.4 | 6.6 | 8 | 0.39 |
| Polycarbonate (PC) | 18.2 | 5.9 | 6.9 | 8 | 0.44 |
| Polylactic acid (PLA) | 18.5 | 8.0 | 7.0 | 8 | 0.45 |
| Polyvinylchloride (PVC) | 18.8 | 9.2 | 6.3 | 8 | 0.46 |
| Polymethylmethacrylate (PMMA) | 18.6 | 10.5 | 5.1 | 8 | 0.48 |
| Polyethylene oxide (PEO, PEG) | 17.0 | 10.0 | 5.0 | 8 | 0.49 |
| CyclicOlefinCopolymer (COC) | 18.0 | 3.0 | 2.0 | 8 | 0.55 |
| PDMS, Polysilicone | 17.2 | 3.0 | 3.0 | 8 | 0.56 |
| Polypropylene oxide (PPO, PPG) | 16.5 | 9.0 | 7.0 | 8 | 0.63 |
| Polyvinylacetate (PVA) | 17.6 | 2.2 | 4.0 | 8 | 0.63 |
| Polysulphone | 16.0 | 6.0 | 6.6 | 8 | 0.66 |
| Polycaprolactone | 17.7 | 5 | 8.4 | 8 | 0.66 |
| Polyethersulfone | 19.0 | 11.0 | 8.0 | 8 | 0.77 |
| Polyphenyleneoxide (PPO) | 17.9 | 3.1 | 8.5 | 8 | 0.79 |
| Epoxy | 17.4 | 10.5 | 9.0 | 8 | 0.82 |
| Polyoxymethylene (POM) | 17.2 | 9.2 | 9.8 | 8 | 0.85 |
| Polyethylene (PE) | 16.9 | 0.8 | 2.8 | 8 | 0.85 |
| Polypropylene (PP) | 18.0 | 0.0 | 1.0 | 8 | 0.95 |
| Polyvinylidenefluoride (PVDF) | 17.0 | 12.1 | 10.2 | 8 | 1.07 |
| Polyvinylbutyral | 18.6 | 4.4 | 13.0 | 8 | 1.23 |
| Polyethylcyanoacrylate | 18.7 | 13.8 | 11.5 | 8 | 1.30 |
| Nylon 66 | 17.4 | 9.9 | 14.6 | 8 | 1.43 |

TABLE 1-continued

| HSPs of DEET and various polymers | | | | | |
|---|---|---|---|---|---|
| Material | δd | δp | δh | Ro | RED DEET |
| Polyacrylonitrile (PAN) | 22.4 | 14.1 | 9.1 | 8 | 1.55 |
| Polyvinylpyrrolidone (PVP) | 18.1 | 10.0 | 18.0 | 8 | 1.84 |
| Polyvinylalcohol (PVOH) | 15.0 | 17.2 | 17.8 | 8 | 2.31 |

This technique affords a significant improvement in the amount of insect repellent that can be loaded into the polymer, a reduction in the processing temperatures of the insect repellent-polymer composites, and a significant increase in the duration of release (and thus effective lifetime) of insect repellent. The insect repellent loading can achieve 68 wt % with the potential of increasing the mass percentage. The low temperature processing enables the incorporation of high vapor pressure and low flash point insect repellents into polymers to produce consumer products such as bracelets or textiles. Minimal loss of insect repellent through commercial manufacturing is anticipated for increased efficacy, decreased waste cost, and increased worker safety. Moreover, the chemical affinity of polymer and insect repellent is anticipated to prolong the repulsion efficacy due to extended diffusion times.

The gelling polymer type can extend to all those with RED≤1 as seen in Table 1. The polymer concentration can thus be adjusted to achieve similar gelation temperatures as those mentioned herein. Further applications can be linings for tents or other outdoor furniture, bednets, gelled components for fans (glade fans), and other applications with demand for insect repellency.

The following examples are given to illustrate specific applications. These specific examples are not intended to limit the scope of the disclosure in this application.

Materials and Methods—Poly(acrylonitrile-co-vinyl chloride) (1:1 mol:mol) bulk fiber was donated by Kaneka Corporation. N,N-diethyl-meta-toluamide (DEET) was purchased from Sigma Aldrich. Hansen Solubility Parameter (HSP) analysis was performed on HSPiP software. Polymer dissolution occurred at internal temperatures not exceeding 130° C. under vigorous mechanical stirring until complete dissolution (around 3 hours). Gel spinning was conducted using a heated stainless steel syringe with capillary opening with a diameter of 2 mm. The filament line was cooled by flowing room temperature air at a quench length of 0.6 m.

Mechanical testing was performed on an Instron 343C-1 equipped with a 1 kN loadcell and pneumatic grips using samples with a gauge length of 10 mm and ramp rate of 100 mm $min^{-1}$. Films were cut into dog-bone shape with thickness of 2.5 mm and width of 5 mm.

Rheological analysis was conducted on a TA Instruments Discovery HR-2 rheometer with a cone and plate configuration (cone diameter=40 mm, angle=2°, and truncation=52 μm). Gelation temperature was determined through an oscillation temperature ramp (truncation gap length=50 μm, stress=5 Pa, frequency=1 Hz, and cooling rate of 2° C. $min^{-1}$ from 90 to 0° C.). The samples underwent conditioning prior to testing at 90° C. for 1 min followed by preshear at 1 Hz for 1 min. Zero-shear viscosity was determined by isothermal oscillation frequency sweeps from 0.001 to 100 Hz at 1% strain. The samples underwent thermal conditioning prior to testing at the designated temperature for 2 min.

Differential Scanning calorimetry (DSC) was conducted on a TA Instruments Discovery DSC. Samples were first conditioned at −40° C. for 10 minutes, and then underwent heating from −40 to 200° C. at 5° C./min under nitrogen. X-ray diffraction measurements were performed using a Rigaku SmartLab X-ray Diffractometer (XRD). The SmartLab XRD was equipped with a Cu anode operating at 3 kW generating Cu Kα radiation. Measurements were taken with Bragg-Brentano Optics and a D/Tex Detector for 2θ measurements from 10° to 75°. Thermogravimetric Analysis (TGA) was conducted on a TA Instruments Discovery TGA with platinum pans. The samples were under constant nitrogen purge at 40 mL $min^{-1}$. Heating ramps were conducted at 5° C. $min^{-1}$. Scanning Electron Microscopy (SEM) was conducted on a JEOL JSM-7600F. Operating voltage was set to 10 kV. Samples were sputter coated with at least 3 nm of gold prior to SEM analysis using a Cressington 108 auto sputter coater equipped with a MTM20 thickness controller.

Mosquito repellency of physical gels were evaluated using an adapted bioassay method that consisted of 3.8 cm diameter by 30.5 cm clear glass cylinders placed at a 45° incline. Small (1.2 cm diameter×2.5 mm width) and large (3.5 cm diameter×2.5 mm width) physically gelled discs were stored at −80° C. prior to testing and allowed to reach room temperature (approx. 22° C.) for at least 15 min but no more than 30 min at the start of the bioassay. The gelled disks were fixed between 2 wire screen discs, secured into an open-ended translucent polyethylene cap (4.5 cm diameter×1.0 cm width; SF-16, Caplugs, Buffalo, NY), and placed at the top of each tube. An average of 19±5 non-blood-fed, five to seven-day-old, insecticide-susceptible female *Ae. aegypti* (ORL1952 strain) were mouth aspirated into each cylinder. Once mosquitoes were introduced into each tube, the end was capped with a screened disc of the same mesh size to prevent escape of mosquitoes and provide ventilation. Testing started at approximately 0700 with the location of mosquitoes in each tube recorded at 15 min, 30 min, 1 h, then hourly through 8 h of continuous exposure. To determine residual effectiveness of treatments, single discs were evaluated weekly through 12 wks. Between these time intervals, all discs were stored in un-sealed, clear plastic polyethylene bags (separated by large and mini discs) at ambient room temperature in a windowless laboratory under a 12:12 light-dark fluorescent overhead lighting cycle where approximately 1700 to 0500 was unlit. All disks were weighed prior to testing to determine amount of repellent retained in each disk over time. Room temperature and relative humidity were recorded with a ThermoPro TP49 digital meter at the time of evaluation. Results are presented as the percent of mosquitos past the testing tube midline, termed as repellency.

Figure 1B:
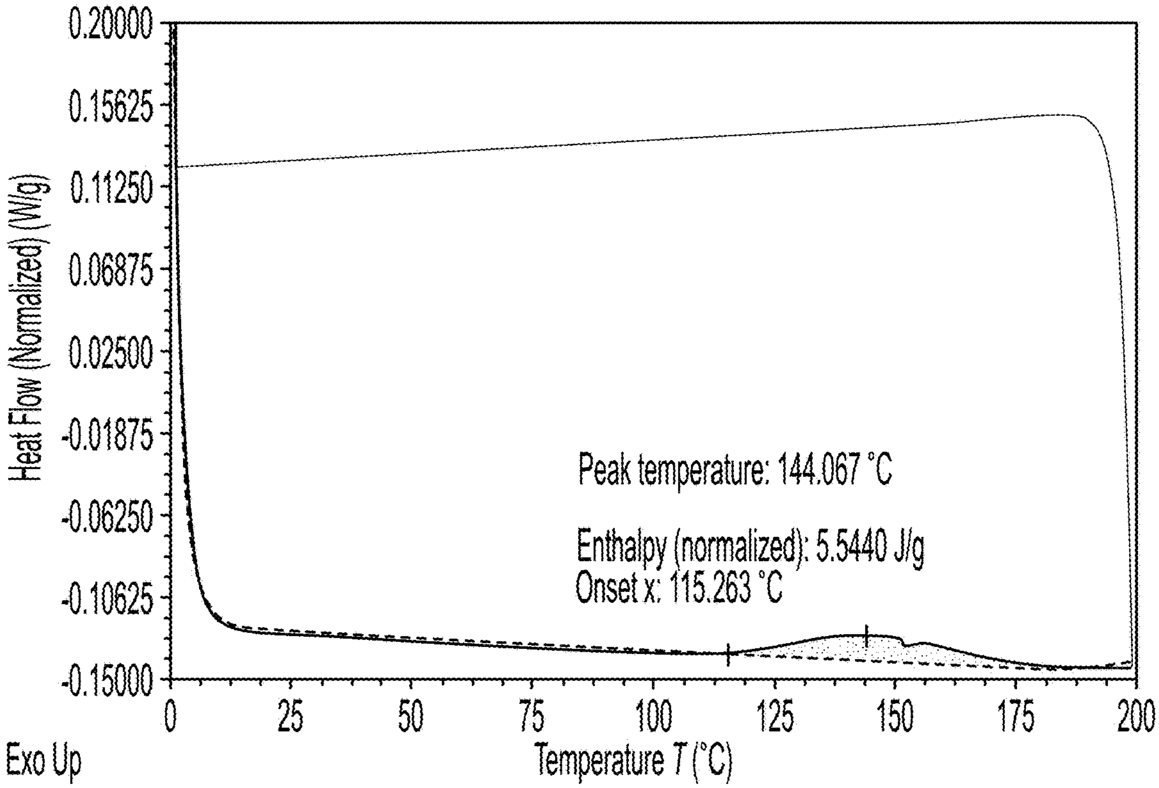

Determination of Polymer Dissolution through DSC Analysis-DSC temperature sweeps of P(AN-VC) fibers show two exothermic peaks at 138 and 146° C. that correlate to the recrystallization temperature of the vinyl chloride and acrylonitrile domains, respectively (FIG. 1A). Upon dissolution in DEET at temperatures not exceeding 130° C., the vinyl chloride peak disappeared leaving only the acrylonitrile recrystallization peak (FIG. 1B). Polyacrylonitrile has an RED value of 1.55 indicating its immiscibility with DEET, in accordance with the retention of its recrystallization peak.

Figure 2:
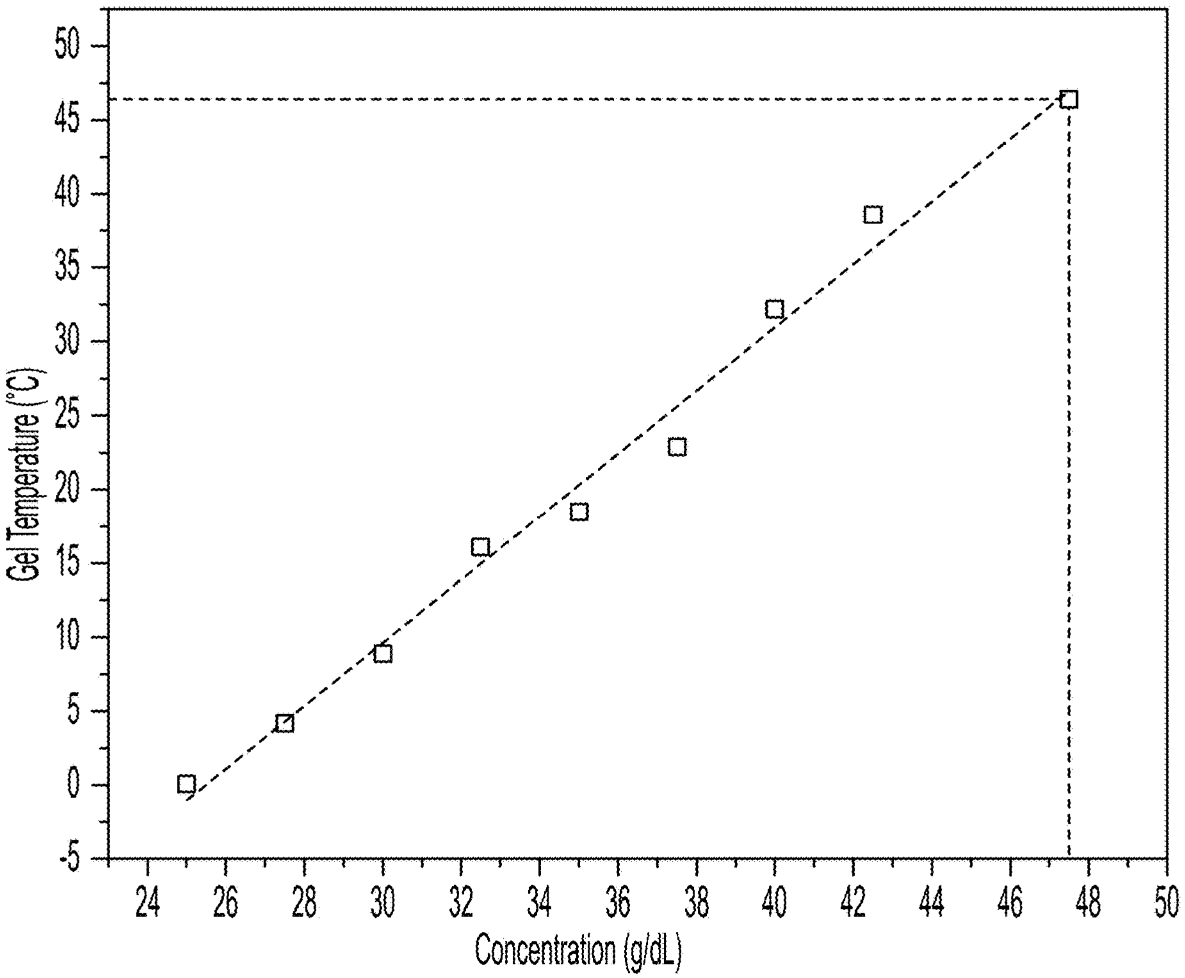
FIG. 2 shows a linear correlation between gel temperature and concentration of P(AN-VC).

Tuning Physical Gels—A linear correlation between gel temperature and concentration of P(AN-VC) was observed (FIG. 2). For increased washfastness properties, a gel temperature of 45° C. was targeted to maintain a gelled morphology during a typical "warm" water setting during laundering. The extrapolated concentration for a 45° C. gel temperature was found to be ~47.5 g/dL and was proven experimentally.

Figure 3A:
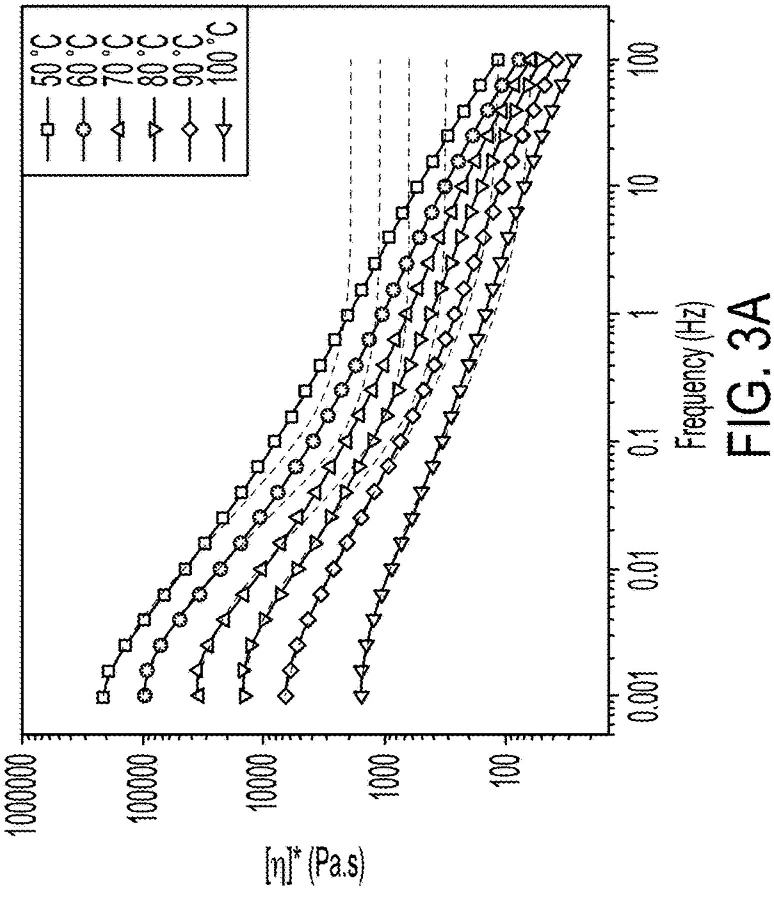
FIGS. 3A and 3B show the zero shear viscosity at varying temperature.
Figure 3B:
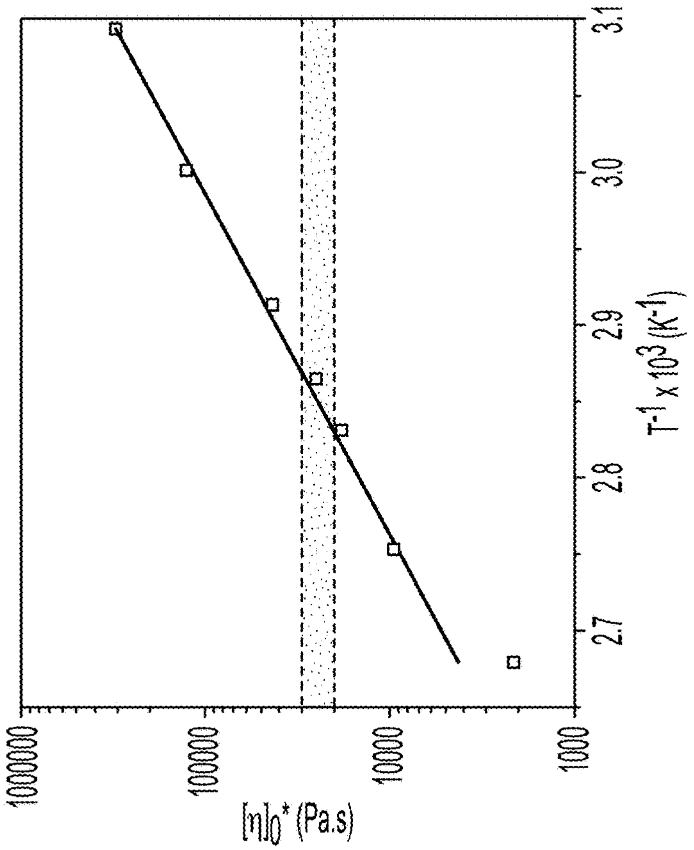

The resulting 47.5 g/dL P(AN-VC)/DEET physical gel exhibited physical properties to that of a hard gel at room temperature. However, the gel softened with increasing temperature, and flow properties were present in temperatures exceeding 45° C. To determine its processability, the zero shear viscosity at varying temperature were measured (FIGS. 3A and 3B). Specifically, dry-jet wet spinnability has been correlated to a polymer solution with a zero shear viscosity ranging from 20-30 kPa. A temperature of ~76° C. was found to have a zero-shear viscosity within this range, thus underscoring for the potential of manufacturing processes such as injection molding and fiber spinning.

Figure 4A:
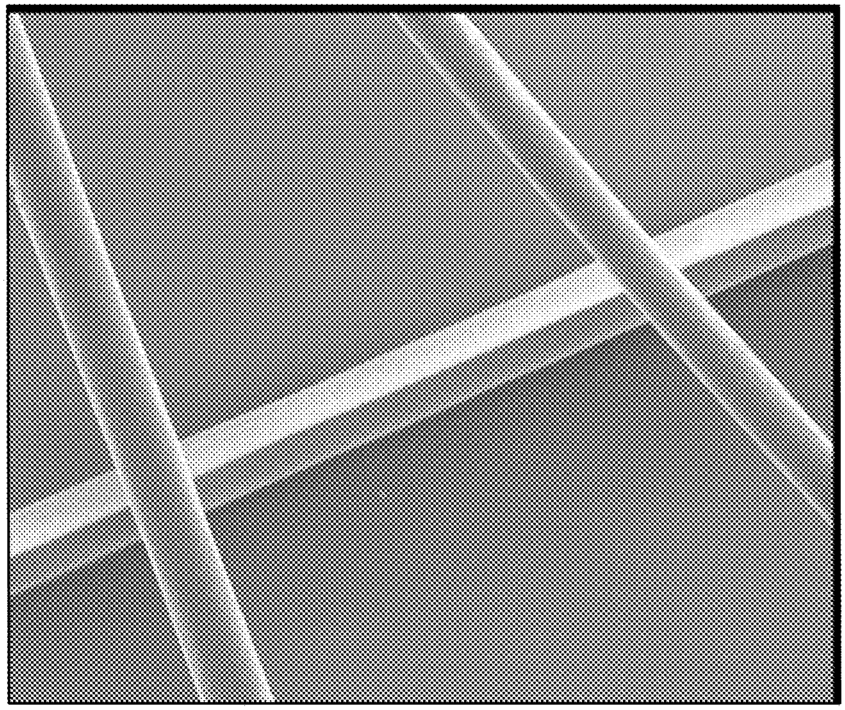
FIGS. 4A and 4B show micrographs of sub 100 μm filaments.
Figure 4B:
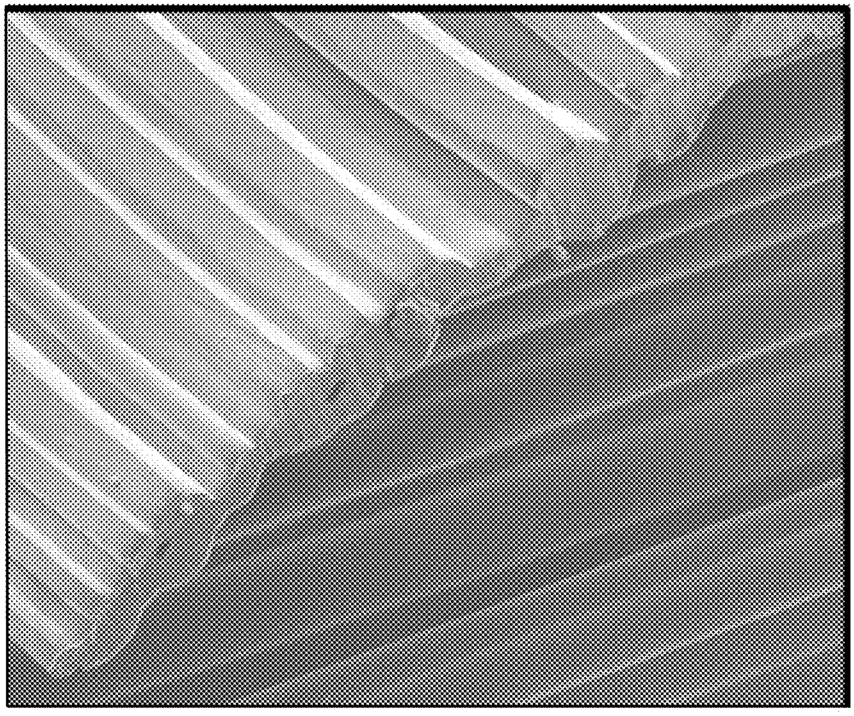

Gel Spinning of Insect Repellent-loaded Physical Gel Filaments—Spinnability was achieved with a syringe heating belt at a temperature of 160° C. The temperature of the exiting P(AN-VC)/DEET "semi-melt" was recorded at 70-80° C., underscoring loss of heat in the syringe system. Filaments were collected with a feed rate of 0.159 m/min and take up rate of 110 m/min resulting in a draw ratio of 691. Sub 100 μm filaments were collected as seen in FIGS. 4A and 4B. Due to insufficient cooling of the filament line, the malleable filaments distorted on the surface of the take up roller as seen in FIG. 4A, and overlapping filaments fused together as seen in FIG. 4B.

Figure 5:
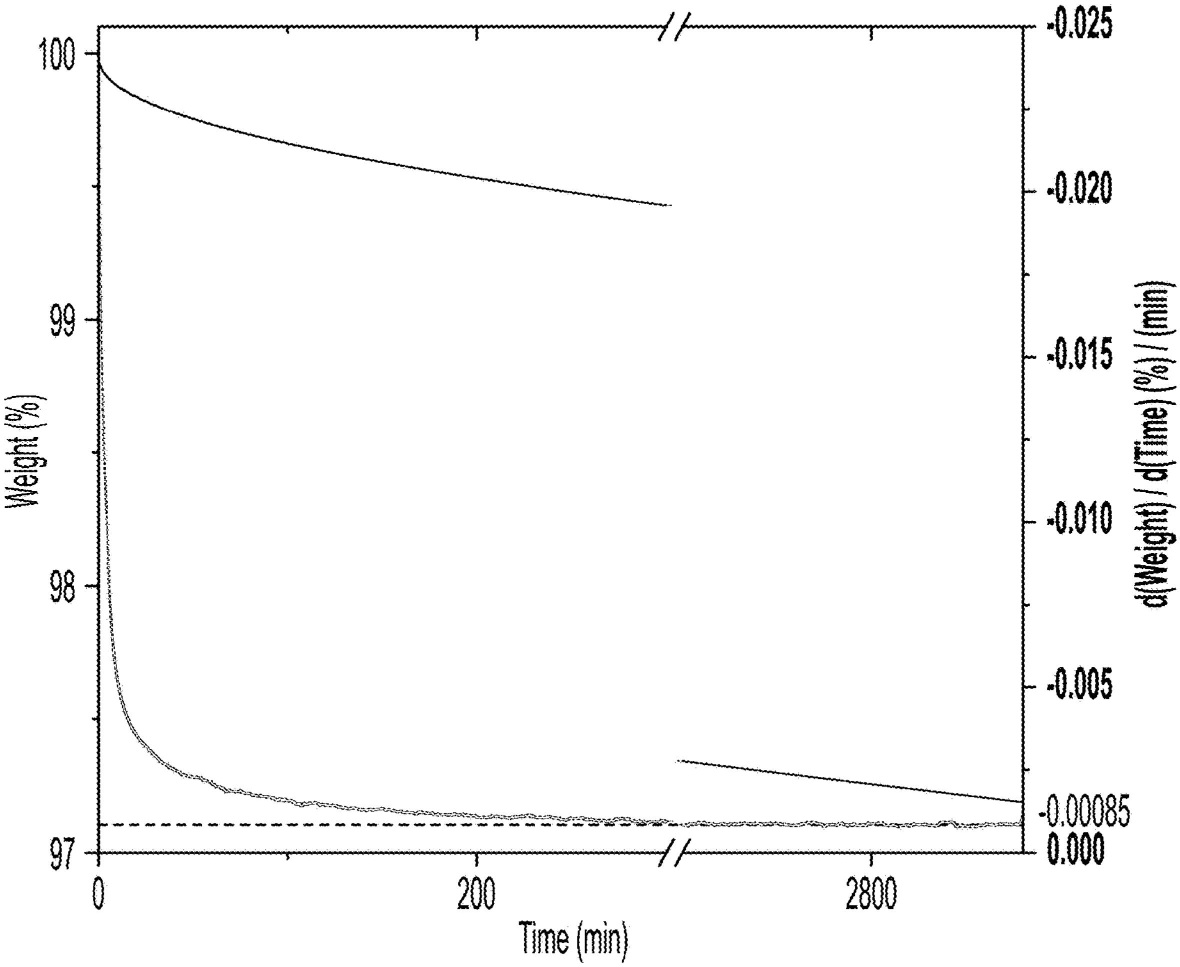
FIG. 5 shows an isothermal TGA at 30° C.

Diffusion Rate Characterization Through TGA—Isothermal TGA (FIG. 5) at 30° C. saw an initial first order decay until 250 min elapsed, where a zero-order decay was exhibited. The initial first order decay can be attributed to the vaporization of the DEET-DEET domains with minimal influence from the polymer. The combination of chemical affinity and physical entrapment associated in the DEET-polymer domains could have influenced the vaporization of DEET to follow a zero order decay. Beyond 250 min, a constant loss of $8.5\times10^{-4}$%/min was observed which correlates to a lifespan of 80 days.

Figure 6:
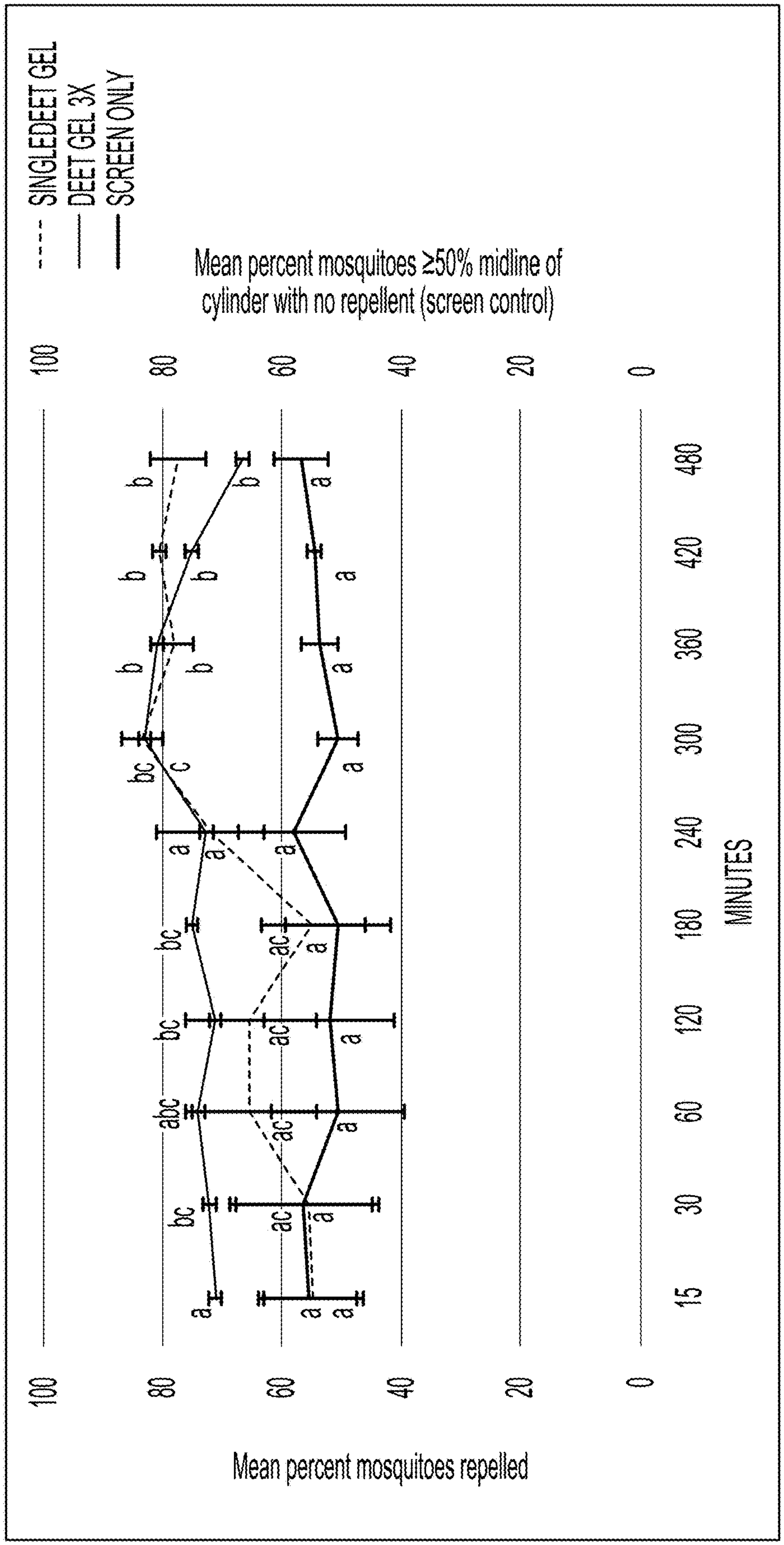
FIG. 6 shows mean percent repellency of female *Aedes aegypti* to poly(acrylonitrile-co-vinyl chloride) gel discs impregnated with DEET compared with screen only controls.
Figure 7:
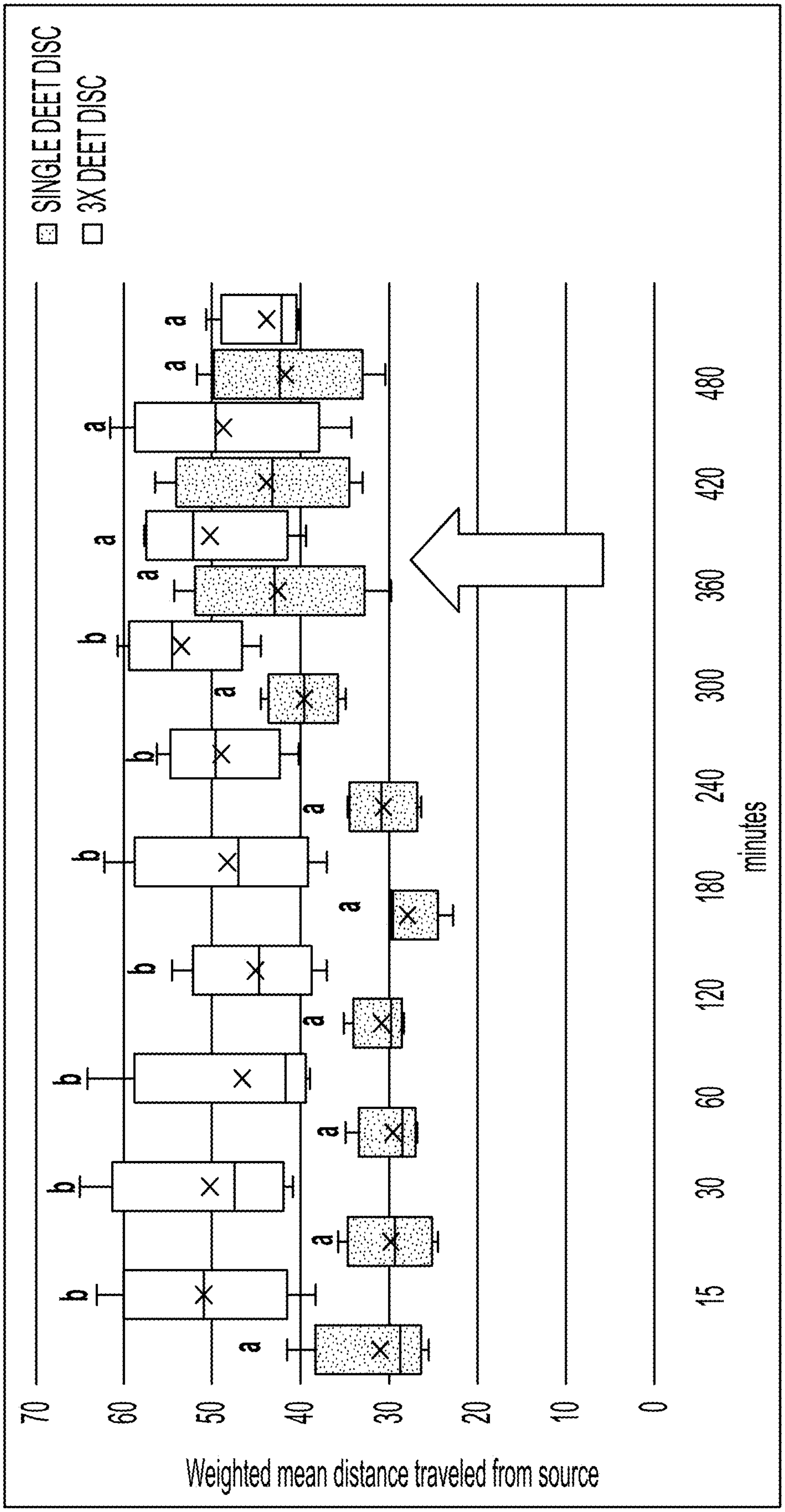
FIG. 7 shows relative weighted mean distance (cm) traveled of female *Aedes aegypti* from repellent source during exposure to single or multiple (3) gel discs impregnated with DEET in glass cylinders.

Live Insect Testing of P(AN-VC)/DEET Physical Gels—FIG. 6 shows repellency of 47.5 g/dL P(AN-VC)/DEET gels against live female *Aedes aegypti* mosquitos for 8 h. The DEET-gels exhibited immediate and sustained repellent release greater than that of control (screen only) over 8 h period. This result provides direct proof of principle of the repellency of the DEET-gels against live insects using a recently developed WHO-modified bioassay. FIG. 7 shows relative weighted mean distance (cm) traveled of female *Aedes aegypti* from repellent source during exposure to single or multiple (3) gel discs impregnated with DEET in glass cylinders.

Figure 8:
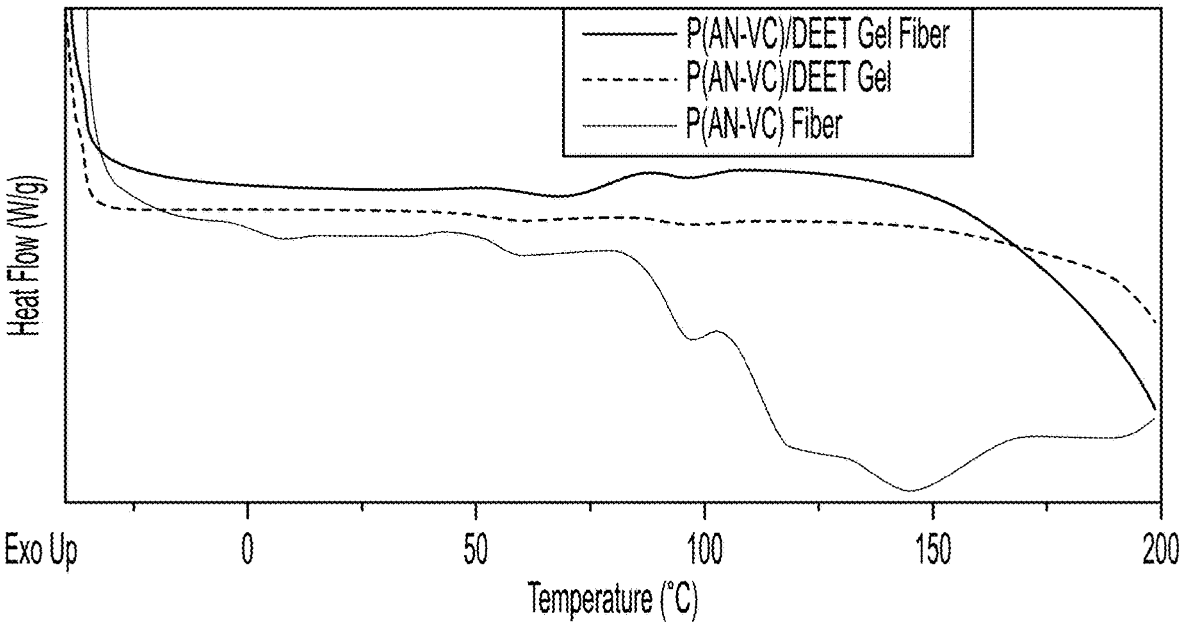
FIG. 8 shows DSC of P(AN-VC) fiber, P(AN-VC)/DEET gel, and P(AN-VC)/DEET gel fiber.

Physical gels can be identified by the dampened exothermic and endothermic peaks in DSC measurements, which are associated with crystallization and crystal melting, respectively. The DSC temperature sweep of P(AN-VC) fibers exhibit a glass transition temperature (Tg) at 55° C., associated with the VC domains (FIG. 8). The dramatic Tg at 100° C. is associated with the AN domains which allow for polymer relaxation and ensuing crystallization as indicated by the exothermic crystallization peak at 110° C. The endothermic peak at 145° C. correlates with the melting of partially gelled VC domains. The P(AN-VC)/DEET gels exhibited dampened VC and AN Tg shifts and complete loss of crystallization and melting peaks as expected from a predominately noncrystalline physical gel. The P(AN-VC)/DEET gel fibers exhibited slightly enhanced exothermic crystallization peaks possibly due to the high draw induced upon gel spinning.

Figure 9:
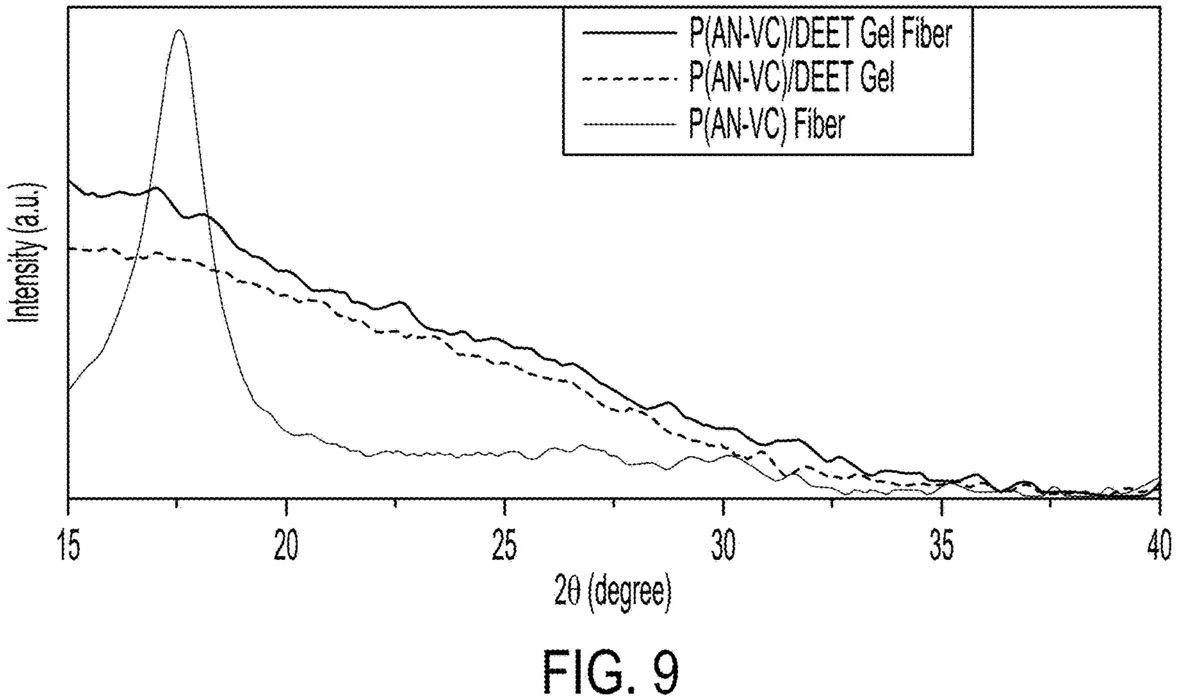
FIG. 9 shows XRD of P(AN-VC) fiber, P(AN-VC)/DEET gel, and P(AN-VC)/DEET gel fiber.

Physical gels are expected to exhibit peak broadening in their XRD relative to their solid state due to its predominantly noncrystalline microstructure. The XRD diffractograms of P(AN-VC) fibers displayed a sharp peak at ~17° which is associated with the (100) plane of PAN crystals (FIG. 9). The P(AN-VC)/DEET gel and gel fiber both exhibited dramatic peak broadening in what is assumed to be the PAN (100) peak, indicating smaller crystal sizes than in P(AN-VC) fibers. The peak also shifted towards a smaller incident angle, indicating larger d-spacing. This highly amorphous pattern supports the presence of a gelled morphology within these P(AN-VC)/DEET composites.

Figure 10:
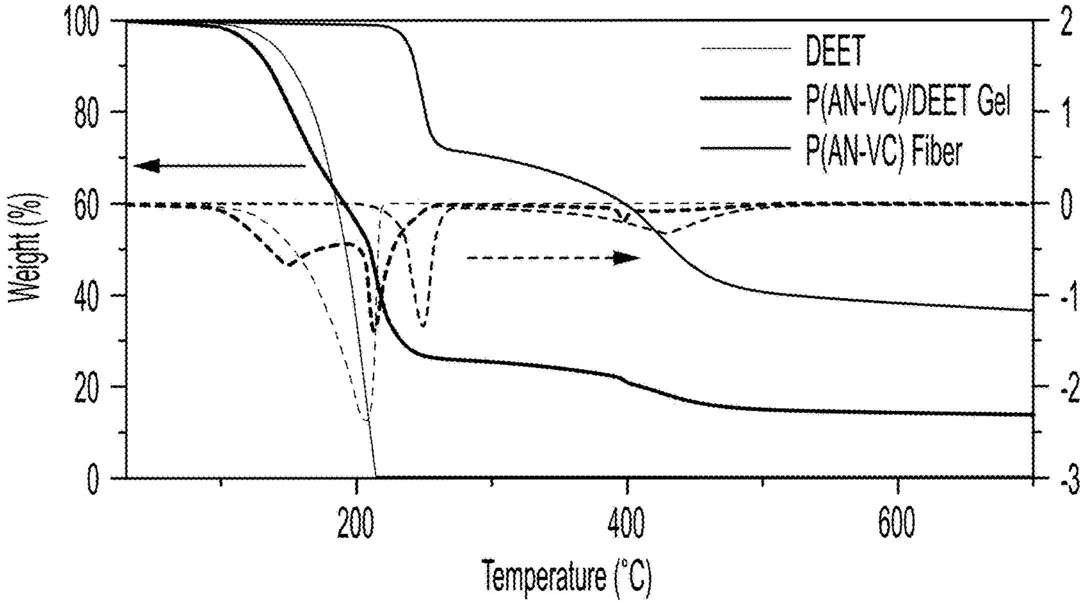
FIG. 10 shows TGA under 5° C./min ramp to 700° C. for P(AN-VC) fiber, DEET, and P(AN-VC)/DEET gel.

P(AN-VC)/DEET Desorption and Mosquito Bioassay-DEET desorption kinetics were measured through TGA and DTG to predict the lifespan of P(AN-VC)/DEET gels. Temperature ramps of P(AN-VC) fiber displayed a DTG peak at 250° C. with peak onset at ~190° C., which was attributed to the dehydrochlorination of VC domains (FIG. 10). An additional small peak occurred at ~400° C. associated with degradation of AN domains. Pure DEET exhibited onset loss at ~100° C., which grew exponentially with increasing temperatures. Interestingly, a DTG peak in P(AN-VC)/DEET gels was seen at ~140° C., which is associated with DEET loss, however, did not grow exponentially with temperature as with pure DEET, but reduced and plateaued until the VC dehydrochlorination peak at 210° C. This restriction of DEET loss could be due to the physical and chemical hindrance by the polymer matrix. The P(AN-VC)/DEET gels exhibited a downward shift in the VC dehydrochlorination DTG peak to 210° C., which could be due to the increased chain mobility, and decreased crystallinity in the VC-DEET solvated domains, thus lowering the activation energy required for dehydrochlorination.

Figure 11:
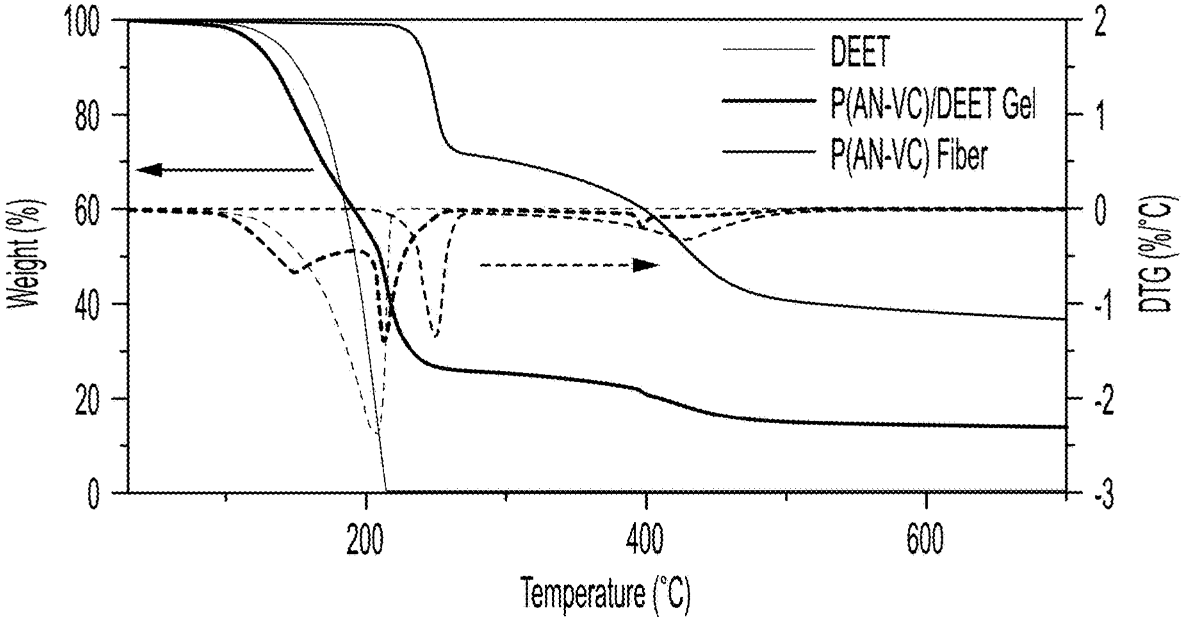
FIG. 11 shows TGA under isothermal at 130° C. for 10 h then 5° C. $\min^{-1}$ ramp to 700° C. for P(AN-VC) fiber, DEET, and P(AN-VC)/DEET gel.

DEET content in P(AN-VC)/DEET gels were determined through isothermal TGA at 130° C. over 10 hours to ensure complete DEET removal while preventing VC dehydrochlorination (FIG. 11). The 47.5 g $dL^{-1}$ P(AN-VC)/DEET gels were composed of 61.0±0.5 wt % DEET, suggesting ~7 wt % DEET loss through gel processing. The gel displayed extended DEET retention at 130° C. compared to pure DEET, which is attributed to the physical and/or chemical hindrance by the polymer matrix.

Figures 12, 13:
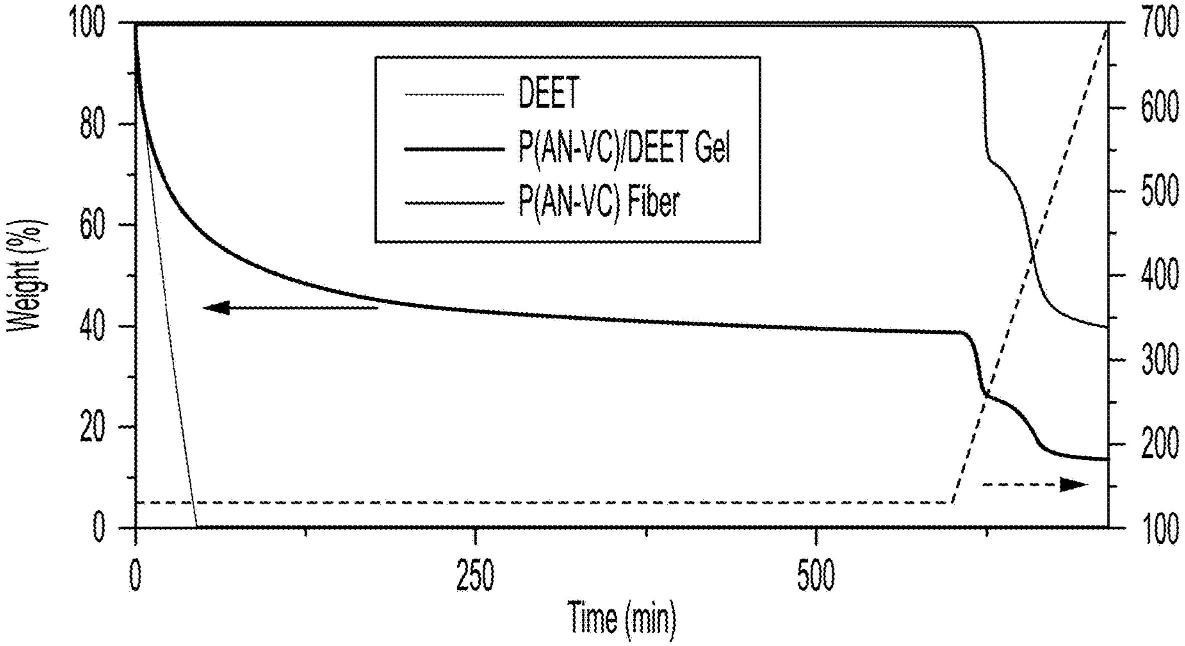
FIG. 12 shows isothermal TGA at 30° C. for 48 h for DEET and P(AN-VC)/DEET gel.
FIG. 13 shows three-phase exponential decay fitting for P(AN-VC)/DEET gel.

When held at 30° C. for 48 hours, the P(AN-VC)/DEET gels exhibited a loss of 1.2 wt % (2 wt % DEET) compared to a loss of 6.2 wt % in pure DEET (FIG. 12). The longevity of pure DEET contradicts studies indicating maximum reported efficacy times of 10 hours, underscoring the influence of surface area on desorption rates, especially when applied on skin via aerosol or spray, in conjunction with DEET loss through dermal absorption.

The 30° C. isothermal TGA were best fit with a three-phase exponential decay function (FIG. 13). Fixing the plateau weight (Wo) to the polymer composition within the gel resulted with rate constants ($\lambda_1$, $\lambda_2$, $\lambda_3$) of $2.69\times10^{-2}$, $3.16\times10^{-3}$, and $4.66\times10^{-6}$ $min^{-1}$, which correlate to mean lifespans of 37, 316, and $2.15\times10^{5}$ min, respectively. This suggests that after $2.15\times10^{5}$ min (21.3 weeks), 36.7% of the initial content of DEET will remain within the system. It is proposed that the gel exhibits a three-phase exponential decay desorption mechanism due to the multiple mechanisms for desorption that correlate with each phase. Cross-sectional SEM imaging of 0 and 20 h of isothermal TGA at 30° C. suggests the three-phase phenomena to be driven by surface skin development. The first phase is attributed to desorption of DEET-DEET domains on the surface of the gel, which leads to a rapid loss of DEET. The second phase undergoes a longer mean lifespan, but identical weight loss ($W_i$) compared to the first phase, indicating suppressed DEET desorption. This phase could be DEET vaporization among DEET-P(AN-VC) domains in the immediate gel-air interface that results in skin formation on the surface of the gel membrane. The final phase is the resulting desorption of DEET in DEET-P(AN-VC) domains that diffuse through the concentration gradient induced by the newly formed skin.

Figure 14:
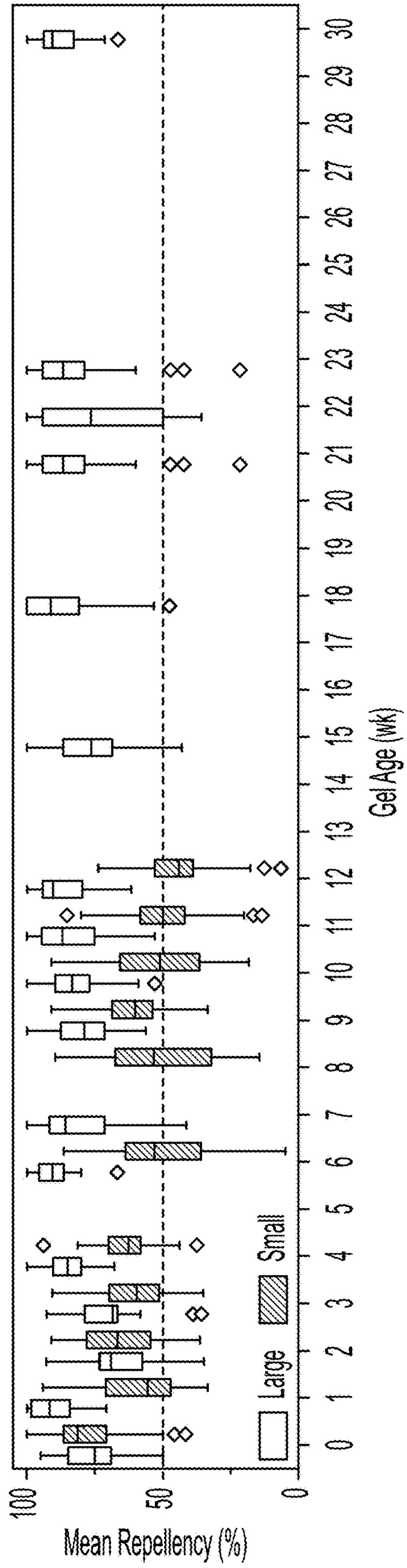
FIG. 14 shows mean repellency lifespan of large and small P(AN-VC)/DEET gel films.
Figure 15:
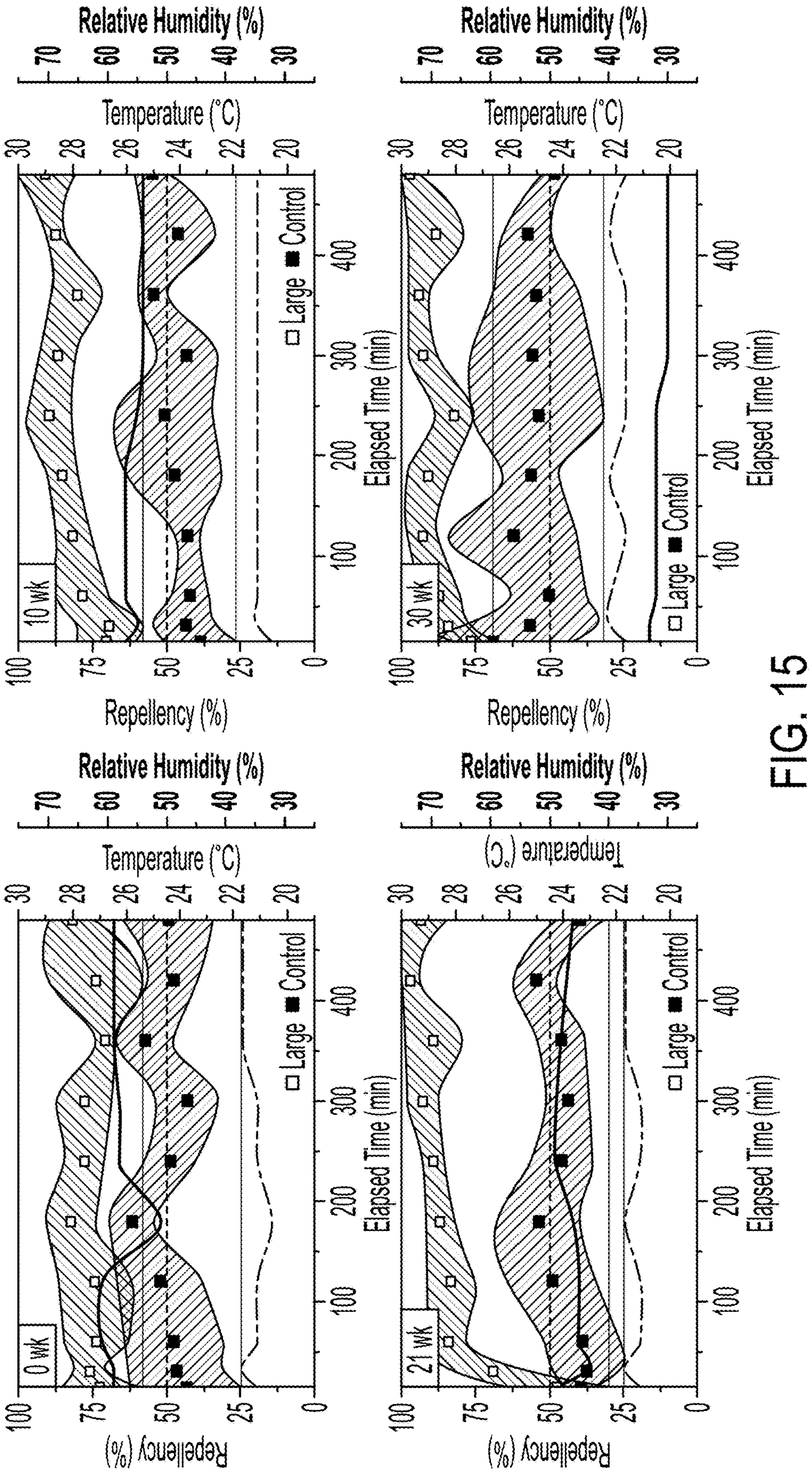
FIG. 15 shows repellency of large P(ANVC)/DEET gel films throughout mosquito bioassay period at 0, 10, 21, and 30 weeks.

P(AN-VC)/DEET gel films were subjected to mosquito bioassay to evaluate their effective lifespan. Mosquito bioassay of circular P(AN-VC)/DEET films exhibited significant differences in mean repellent longevity dependent on the film diameter (FIG. 14). Large (3.5 cm diameter) P(AN-VC)/DEET films displayed significant mean repellency beyond 30 weeks, where a 50% repellency indicates normal, non-repellent, distributional behavior of mosquitoes around the testing midline. A minor deviation occurred at week 2, likely due to the behavioral variability in the cohort of mosquitos tested that week. Small (1.2 cm diameter) P(AN-VC)/DEET films failed to show significant repellency beyond week 3, with an undetermined variation in week 1 results. Up to 18 weeks testing duration, the degree of repellency was immediate and independent of time during each weekly 480 min (8 h) trial (FIG. 15). However, beyond week 18 a time-dependence developed resulting in a delay of approx. 30 min in each weekly trial to reach effective mosquito repulsion. The lower DEET concentration within the gel and increased skin thickness may decrease the concentration gradient and resulting rate of desorption, according to Fickian law.

Figure 16:
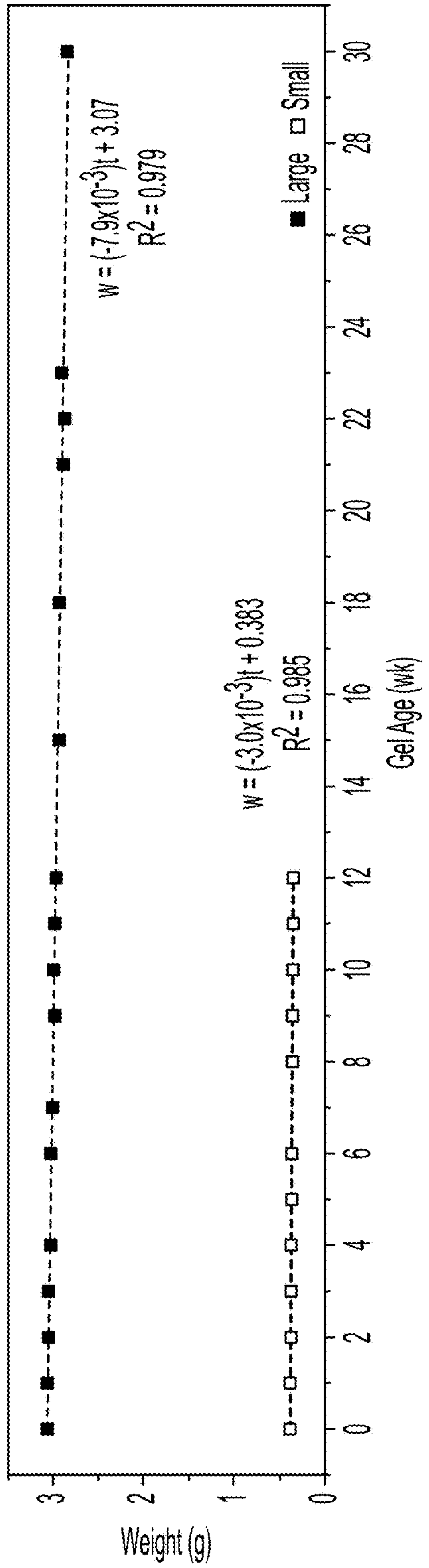
FIG. 16 shows weight loss of large and small P(AN-VC)/DEET gel films.

Large P(AN-VC)/DEET films exhibited consistent weight loss of 7.9 mg $wk^{-1}$, associated with DEET desorption, whereas the small films only lost 3.0 mg $wk^{-1}$ (FIG. 16). At 21 weeks, only 9.5 wt % of DEET was lost in large P(AN-VC)/DEET gels, inconsistent with isothermal TGA estimates of a 65.3 wt % loss. Discretions could be due to the consistent nitrogen flow of 40 mL $min^{-1}$ during isothermal TGA which can be faster than ambient indoor airflow during mosquito bioassay conditions, thus accelerating loss of DEET from an increased concentration gradient. Additionally, the mosquito bioassay was performed at lower temperatures (~22° C.) than the 30° C. isothermal TGA, which also likely reduced DEET desorption. Interestingly, while the large P(AN-VC)/DEET gels lost 5.6 wt % DEET at 12 weeks, the small P(AN-VC)/DEET gels lost 16.4 wt % DEET. The samples have similar surface area-to-volume ratios (801 vs 803 $m^{-1}$, respectively) and exhibit different weight loss per unit surface area (0.42 vs 1.3 mg $m^{-2}$ $wk^{-1}$, respectively). The larger weight loss per unit surface area in the small gel films than large gel films was attributed to the smaller concentration of DEET vapor within the fixed bioassay volume resulting in an increased concentration gradient between the gel and immediate volume surrounding the gel, which drives a faster rate of desorption per unit surface area over time.

Many modifications and variations are possible in light of the above teachings. It is therefore to be understood that the claimed subject matter may be practiced otherwise than as specifically described. Any reference to claim elements in the singular, e.g., using the articles "a", "an", "the", or "said" is not construed as limiting the element to the singular.

REFERENCES (1) Global vector control response 2017-2030; World Health Organization.

(2) Bhatt, S.; Weiss, D. J.; Cameron, E.; Bisanzio, D.; Mappin, B.; Dalrymple, U.; Battle, K.; Moyes, C. L.; Henry, A.; Eckhoff, P. A.; et al. The effect of malaria control on *Plasmodium falciparum* in Africa between 2000 and 2015. Nature 2015, 526 (7572), 207-211. DOI: 10.1038/nature15535 From NLM Medline.

(3) Katz, T. M.; Miller, J. H.; Hebert, A. A. Insect repellents: historical perspectives and new developments. J Am Acad Dermatol 2008, 58 (5), 865-871. DOI: 10.1016/j.jaad.2007.10.005 From NLM Medline.

(4) Ryan, J. J.; Casalini, R.; Orlicki, J. A.; Lundin, J. G. Controlled release of the insect repellent picaridin from electrospun nylon-6,6 nanofibers. Polym Advan Technol 2020, 31 (12), 3039-3047. DOI: 10.1002/pat.5028.

(5) Jin, X.; Wei, C. X.; Wu, C. W.; Zhang, W. Customized Hydrogel for Sustained Release of Highly Water-Soluble Drugs. ACS Omega 2022, 7 (10), 8493-8497. DOI: 10.1021/acsomega.1c06106.

(6) Mullarney, M. P.; Seery, T. A. P.; Weiss, R. A. Drug diffusion in hydrophobically modified N,N-dimethylacrylamide hydrogels. Polymer 2006, 47 (11), 3845-3855. DOI: 10.1016/j.polymer.2006.03.096.

(7) Tong, X. M.; Lee, S.; Bararpour, L.; Yang, F. Long-Term Controlled Protein Release from Poly(Ethylene Glycol) Hydrogels by Modulating Mesh Size and Degradation. Macromol Biosci 2015, 15 (12), 1679-1686. DOI: 10.1002/mabi.201500245.

(8) Lin, K. Y.; Wang, D. M.; Lai, J. Y. Nonsolvent-induced gelation and its effect on membrane morphology. Macromolecules 2002, 35 (17), 6697-6706. DOI: 10.1021/ma020073y.

(9) Jimenez, J.; Ford, E. Mapping wet vs gel spinning in Hansen space. Polymer 2021, 124079. DOI: 10.1016/j.polymer.2021.124079.

What is claimed is:

1. A filament or film composition comprising: an insect repellent compound; and a polymer that is miscible in the insect repellent compound at 23° C., wherein the composition comprises at least 25% repellent compound, wherein the polymer is dissolved in the insect repellent, and wherein the polymer is poly(acrylonitrile-co-vinyl chloride).

2. The composition of claim 1, wherein the composition comprises at least 50 wt % of the insect repellent compound.

3. The composition of claim 1, wherein the polymer has a relative energy difference less than or equal to 1 with respect to the insect repellent compound.

4. The composition of claim 1, wherein the insect repellent compound is N,N-diethyl-meta-toluamide.

5. The composition of claim 1, wherein the composition is in the form of a filament.

6. A garment comprising the filament of claim 5.

7. The composition of claim 1, wherein the composition is in the form of a film.

8. A method comprising:

providing an insect repellent compound;

providing a polymer that is miscible in the insect repellent compound at 23° C.; and dissolving the polymer in the insect repellent compound to form a filament or film composition, wherein the composition comprises at least 25% repellent compound, and wherein the polymer is poly(acrylonitrile-co-vinyl chloride).

9. The method of claim 8, wherein the composition comprises at least 50 wt % of the insect repellent compound.

10. The method of claim 8, wherein the polymer has a relative energy difference less than or equal to 1 with respect to the insect repellent compound.

11. The method of claim 8, wherein the insect repellent compound is N,N-diethyl-meta-toluamide.

* * * * *